United States Patent
Lin et al.

(10) Patent No.: US 7,209,201 B2
(45) Date of Patent: Apr. 24, 2007

(54) LIQUID CRYSTAL DISPLAY WITH WIDE VIEWING ANGLE WITH ETCHING STOPPER PLACED IN PROTRUSION

(75) Inventors: Ming-Tien Lin, Lu Chou (TW); Tean-Sen Jen, Ping Chen (TW)

(73) Assignee: HannStar Display Corp., Tao-Yuan Hsien (TW)

( * ) Notice: Subject to any disclaimer, the term of this patent is extended or adjusted under 35 U.S.C. 154(b) by 0 days.

(21) Appl. No.: 10/266,768

(22) Filed: Oct. 9, 2002

(65) Prior Publication Data
US 2003/0156237 A1     Aug. 21, 2003

(30) Foreign Application Priority Data
Feb. 20, 2002    (TW) ............................... 91102925 A

(51) Int. Cl.
G02F 1/1333    (2006.01)
G02F 1/1337    (2006.01)
G02F 1/1339    (2006.01)
G02H 1/136    (2006.01)

(52) U.S. Cl. ..................... 349/129; 349/111; 349/138; 349/43

(58) Field of Classification Search ................ 349/110, 349/129, 156, 111, 43; 348/138
See application file for complete search history.

(56) References Cited

U.S. PATENT DOCUMENTS

2001/0040656 A1* 11/2001 Na et al. .................... 349/110

2002/0047961 A1* 4/2002 Kwag et al. ................ 349/110

FOREIGN PATENT DOCUMENTS

JP      2000029075    * 1/2000

* cited by examiner

Primary Examiner—Andrew Schechter
Assistant Examiner—Hoan C. Nguyen
(74) Attorney, Agent, or Firm—Troxell Law Office, PLLC

(57) ABSTRACT

A TFT-LCD having a first glass substrate provided for fabricating transistors, a second glass substrate provided for fabricating a color filter, and a liquid crystal layer interposed between the second and first glass substrates. The TFT-LCD comprises the following components. A color filter is formed beneath the second glass substrate which has plural color filter elements and a first black matrix, wherein each grid pattern of the first black matrix is disposed to surround a color filter element. And the color filter element formed beneath the second glass substrate extends outward to surfaces of the first black matrix. A common electrode is formed beneath the color filter, wherein a part of the common electrode, the pixel units, and the first black matrix are overlapped to have a downward protruding structure. A second black matrix is formed on the first glass substrate, wherein each grid pattern of the second black matrix is disposed under inner edges of the each grid pattern of the first black matrix. And a pixel electrode is formed on the first glass substrate and located under the color filter element, wherein the pixel electrode extends outward to overlap the second black matrix to have an upward protruding structure.

17 Claims, 8 Drawing Sheets

LIQUID CRYSTAL DISPLAY WITH WIDE VIEWING ANGLE WITH ETCHING STOPPER PLACED IN PROTRUSION

FIELD OF THE INVENTION

The present invention relates to a TFT-LCD structure, and more specifically, to a TFT-LCD structure with a protruding structure composed of the black matrix (BM) for having the large electrical field and oblique electrical field to tilt the liquid crystal molecules in different directions for increasing the wide viewing angle.

BACKGROUND OF THE INVENTION

With the advance of techniques for manufacturing thin-film transistors, the liquid crystal displays (LCD) are widely applied in electrical products, such as PDAs, watches, laptops, digital cameras, mobile phones, etc. due to advantages as smaller size, portability, and lower power consumption. Further, after the industries endeavoring to research and develop new generation of manufacturing technique, the decreasing cost of production makes the TFT-LCD devices more popular and widely applied in various fields. For further promoting the quality and application of TFT-LCD devices, how to increase the wide viewing angle and shorten the response time of image are next important issues nowadays.

Please refer to FIGS. 1A and 1B, these figures show the TFT-LCD devices with multi-domain vertical alignment (MVA) developed by Fujitsu. In the associated manufacturing process, after a pixel electrode 12 is deposited on a first glass substrate 10, a bump 14 is formed thereon for controlling the alignment of liquid crystal molecules. Similarly, in the fabricating process of the color filter, another bump 16 is defined too beneath an upper glass plate 18 and a common electrode 20.

Thus, a plurality of liquid crystal molecules 22 are held between the upper and first glass substrate 18 and 10. The arrangement of liquid crystal molecules 22 without the electric field is illustrated as FIG. 1A. Some liquid crystal molecules 22 adjacent to the bump 14 and 16 are inclined slightly by the affection of bump appearance. After supplying voltage to the pixel electrode 12 and the common electrode 20, the electrical field between the upper and first glass substrate 18 and 10 is getting oblique according to the appearance of the bumps 14 and 16 to drive the liquid crystal molecules 22 rotate in the predetermined directions, as shown in FIG. 1B. Thus, the wide viewing angle, the light transmitting efficiency and the image contrast all can be increased.

Another type of MVA TFT-LCD device provided by Fujitsu is shown in FIGS. 2A and 2B. In this type of TFT-LCD device, instead of forming the bump 14 for molecule alignment, the pixel electrode 12 is etched to form an opening 15 therein. And beneath the common electrode 20, the bump 16 is still formed and disposed staggered with the opening 15. Accordingly, when there is no electric field, the liquid crystal molecules 22 are slightly inclined by affection of the bump 16 as shown in FIG. 2A. And when the pixel electrode and the common electrode are supplied with voltage, the electrical field (as dotted line) is oblique due to affection of the opening 15 and the bump 16 as shown in FIG. 2B. Due to the affections of the bump 16 and the oblique electrical field, the liquid crystal molecules 22 can rotate in the predetermined directions. It is noted that the bump 14 formed on the first glass substrate as shown in FIGS. 1A and 1B is not required in this type of TFT-LCD devices, so the step of forming the bump 14 can be omitted and the throughput can be promoted.

Please refer to FIG. 3, the TFT-LCD with back-side exposure multi-domains homeotropically aligned (BSE-MHA) developed by Industrial Research Institute of Taiwan (IRIT) is illustrated. After fabricating a pixel electrode 30 and bus-lines patterns 32 on a first glass substrate 34, surrounding wall bumps (SWB) 36 are defined on the bus-lines patterns 32, and an alignment film 37 is coated thereon. Besides, after defining a color filter 38 and a black matrix 40 beneath an upper glass plate 42, a common electrode 44 is formed beneath the color filter 38 and surrounding wall bumps 46 are next formed beneath the common electrode 44. And an alignment film 48 is then formed to cover the surrounding wall bumps 46 and the common electrode 44.

When there is no electric field, the most liquid crystal molecules 50 are vertical arranged on the right side of the dotted line in FIG. 3. However, some liquid crystal molecules 50 adjacent to the surrounding wall bump 36 and 46 are slightly inclined due to affection of the bump structures. When the pixel electrode 30 and the common electrode 44 are supplied with voltage to generate the electric field, the liquid crystal molecules 50 can rotate in predetermined directions by affections of the surrounding wall bump 36 & 46 and the oblique electrical field occurring therein to increase the brightness and the wide viewing angle as the left side of the dotted line. Notedly, no matter the MVA type or the BSE-MHA type of TFT-LCD, it is required extra procedures to form the bumps or blocks. And the associated manufacture is more complicated and the production period is prolonged.

Then please refer to FIG. 4, another type of TFT-LCD device by forming stacked bump composed of thin-film transistors is illustrated. The bumps stacked on the first glass substrate 60 include first and second bumps. The first bump comprises the stacked layers of a silicon nitride layer 62, an active layer 64, source/drain electrodes 66 and a passivation layer 68. And the second bump comprises the stacked layers of a gate structure 70, the silicon nitride layer 62 and the passivation layer 68. And a pixel electrode 72 is formed on the first glass substrate 60 between two adjacent the first bumps and on the second bump. Thus due to the affections of the bump appearance and oblique electrical field, the liquid crystal molecules can aligned in different directions to increase wide viewing angle and brightness and to shorten response time of the liquid crystal molecules.

However the associated manufacturing process is very difficult and complex because it is required to stack each layer precisely for forming the bump structures. Especially, following the promotion of the image quality, the occupied areas of the unit pixel and the thin film transistors are shrinkage, so how to deposit and align the later layer precisely onto the former layer and how to assure the gate structure and source/drain electrodes still can operate normally are both difficult.

SUMMARY OF THE INVENTION

A purpose of the present invention is to provide a TFT-LCD structure with increasing wide viewing angle and shorten response time that is fabricated by the original procedures and there is no requirement of any extra step.

The present invention discloses a TFT-LCD structure, which has a first glass substrate provided for fabricating the thin film transistors, a second glass substrate provided for fabricating the color filter, and a liquid crystal layer containing liquid crystal molecules therein interposed between the first and second glass substrate. The TFT-LCD comprises a color filter, a common electrode, a metal black matrix and a pixel electrode. The color filter is fabricated beneath the second glass substrate and has a pixel array which comprises plural color filter elements arranged in order. Each color filter element is adhered beneath the second glass substrate. The color filter also comprises a first insulating black matrix formed beneath the second glass substrate. And the grid pattern of the first insulating black matrix is disposed to surround each color filter element. The edges of the color filter element extend to the surfaces of the first insulating black matrix. Besides, a pattern of a second insulating black matrix is fabricated between the color filter elements and the second glass substrate, and is crossing the central region of the unit pixel to divide it into two parts.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention provides a TFT-LCD structure for enhancing the wide viewing angle. The black matrix formed in the color filter has protruding structures for increasing the electrical field on edges of each unit pixel region and producing the oblique electrical field to increase wide viewing angle. The detailed description is as follows.

Figure 1A:
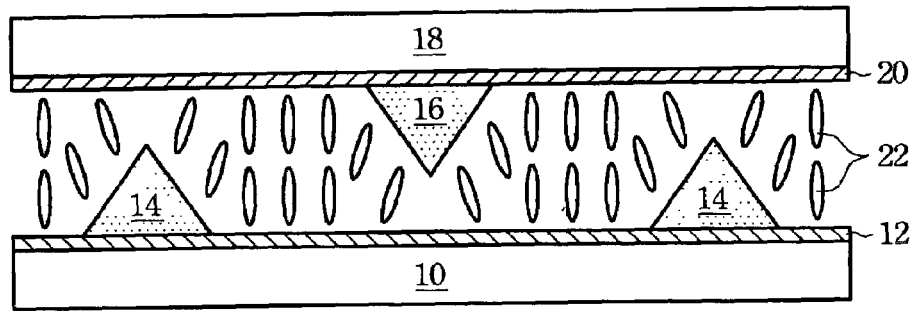
FIGS. 1A, 1B illustrate the cross section view of the MVA (multi-domain vertical alignment) TFT-LCD and the alignments of liquid crystal molecules according to the prior art.
Figure 1B:
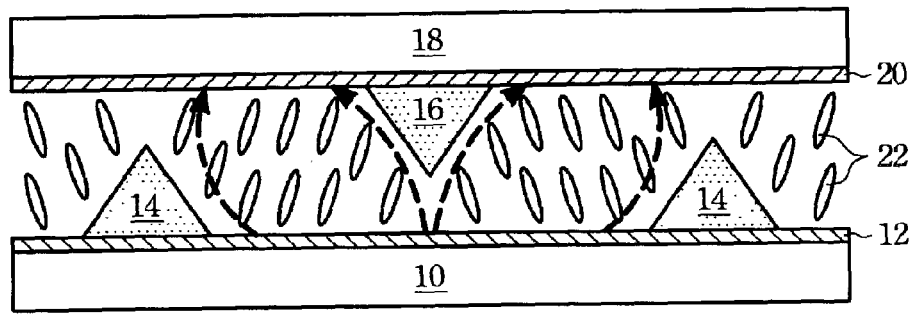
Figure 2A:
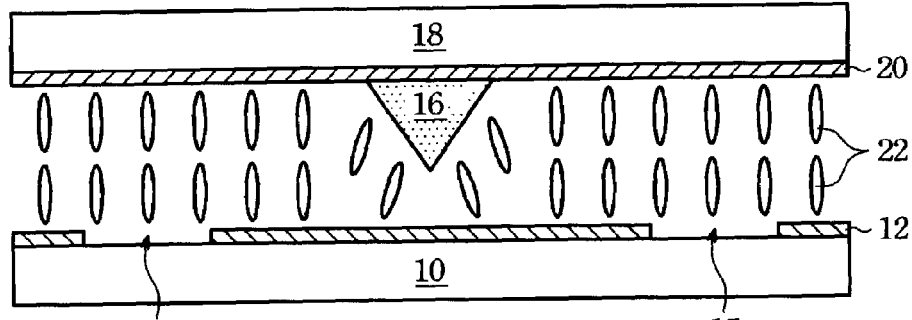
FIGS. 2A & 2B illustrate the cross section view of the MVA (multi-domain vertical alignment) TFT-LCD and the alignments of liquid crystal molecules according to the prior art.
Figure 2B:
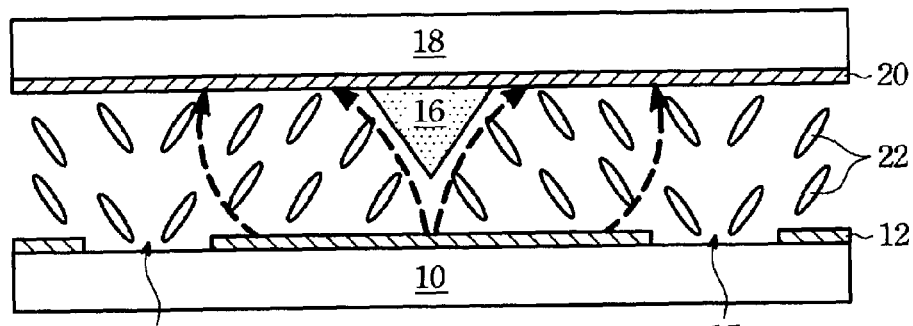
Figure 3:
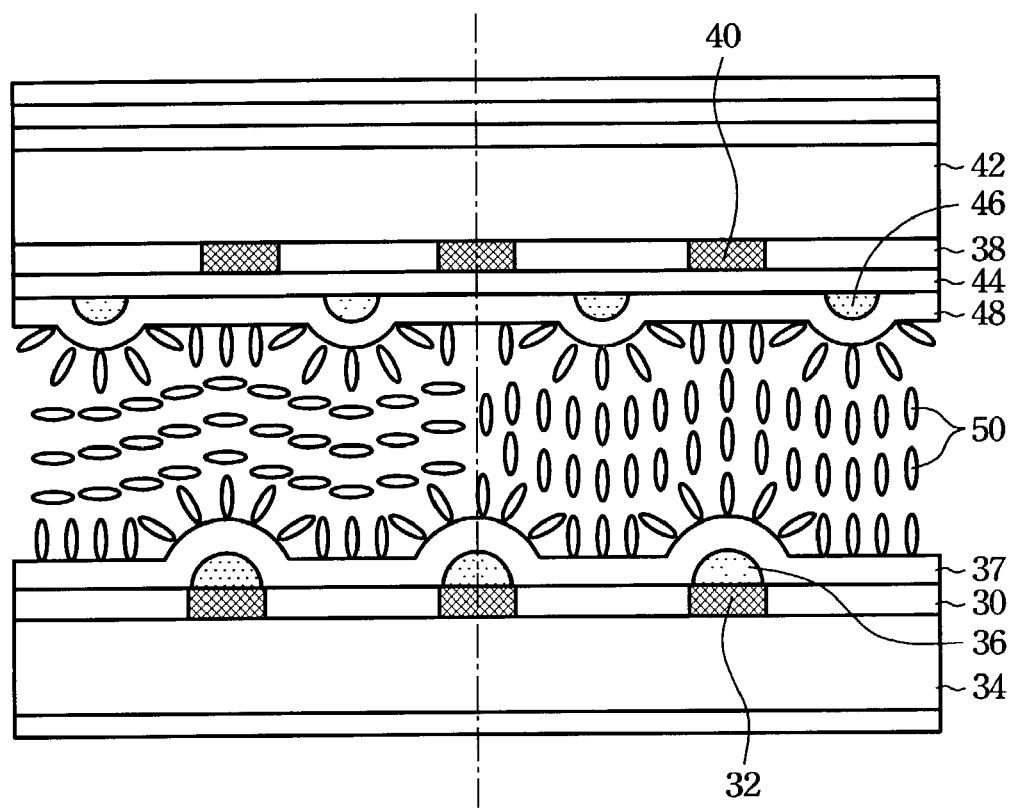
FIG. 3 illustrates the cross section view of the BSE-MHA type of TFT-LCD and the alignments of the liquid crystal molecules according to the prior art.
Figure 4:
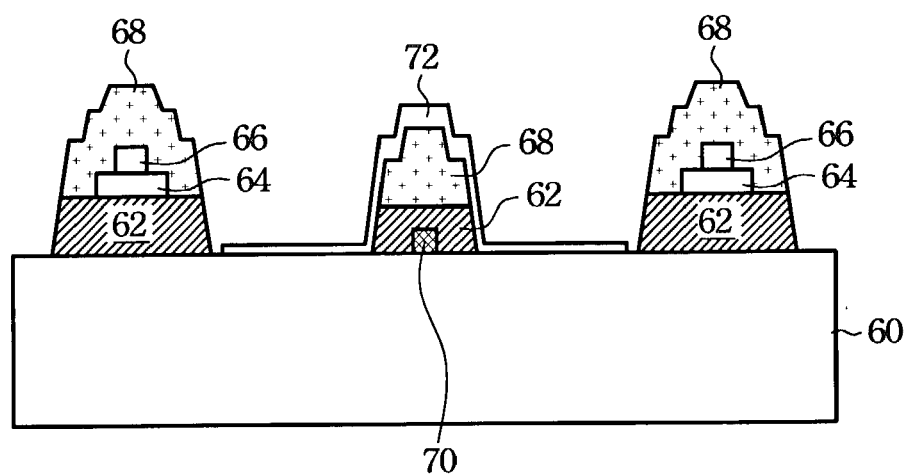
FIG. 4 illustrates the cross section view of the EVA type of TFT-LCD and the alignments of the liquid crystal molecules according to the prior art.
Figure 5A:
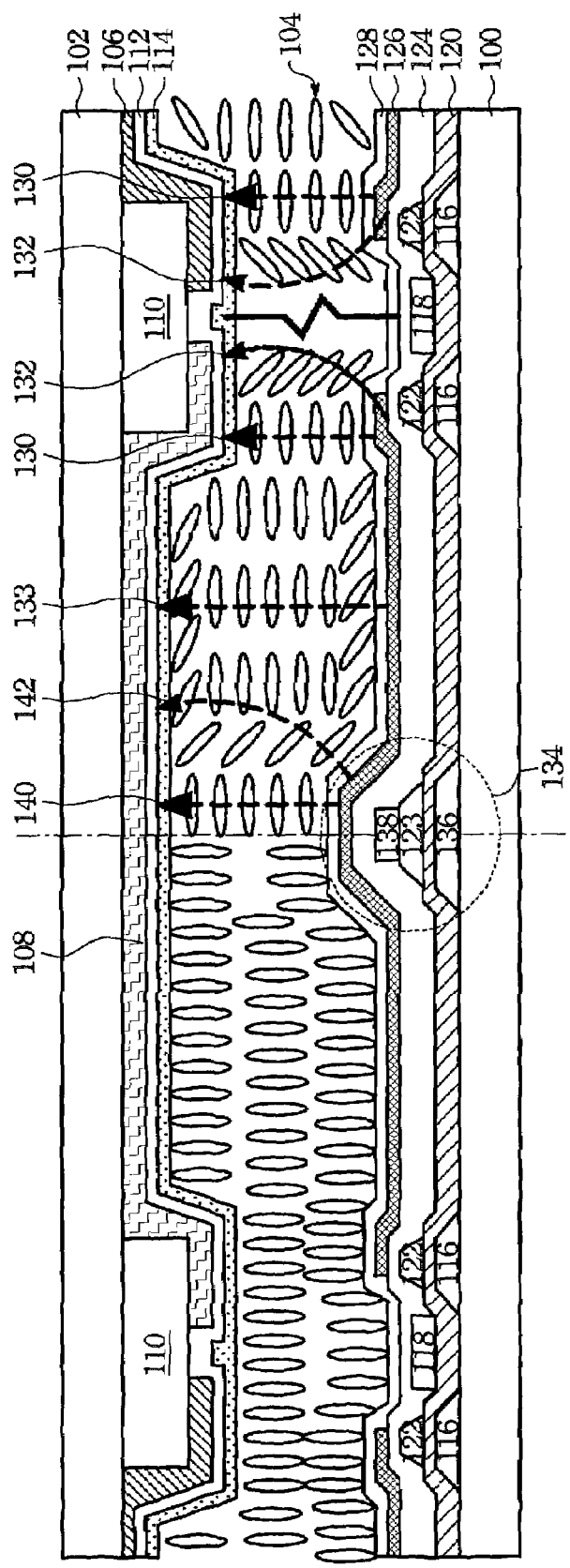
FIGS. 5A, 5B and 5C illustrate the cross section view and top view of the TFT-LCD structure and the alignments of the liquid crystal molecules according to the first embodiment of the present invention.
Figure 5B:
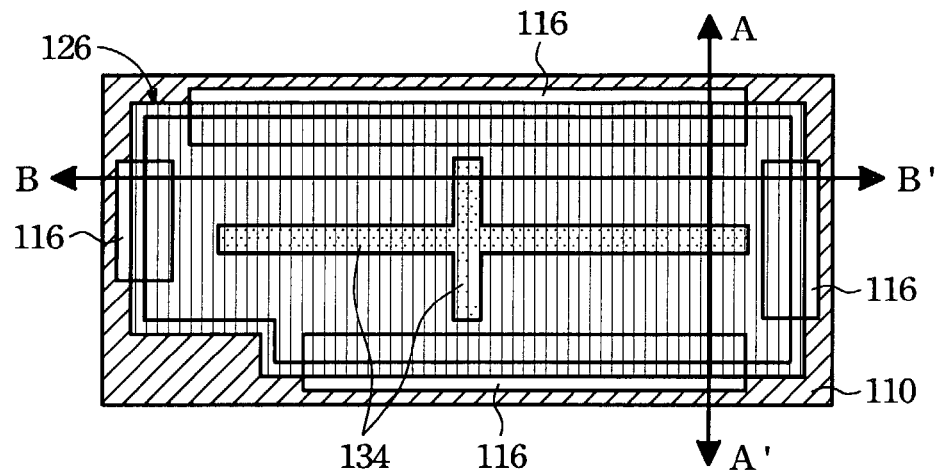
Figure 5C:
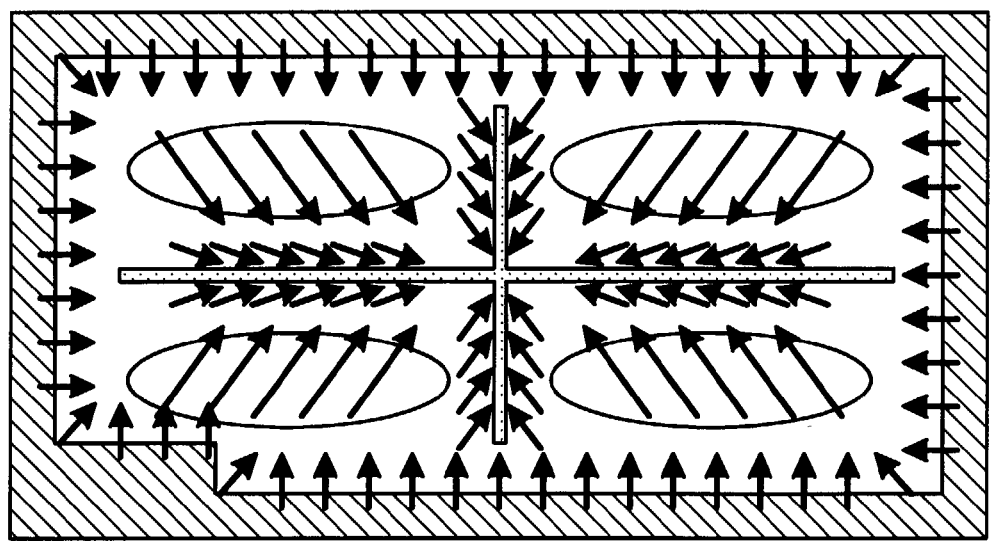

First Embodiment:

Please refer to FIGS. 5A, 5B and 5C, which illustrate the TFT-LCDs with wide viewing angle and rapid response speed according to the present invention. FIG. 5A shows the cross-section view of a unit pixel of the TFT-LCD. The TFT-LCD structure comprises a first glass substrate 100 provided for fabricating thin-film transistors and a second glass substrate 102 provided for fabricating a color filter. And a liquid crystal layer 104 containing liquid crystal molecules is interposed between the first and second glass substrate 100 and 102. When the electric field supplied to the liquid crystal layer 104 is changed, the alignments and arrangements of the liquid crystal molecules are also changed to alter the transmitting angle of light therein.

The TFT-LCD also comprises a color filter 106 fabricated beneath the second glass substrate 102. The color filter 106 has plural color filter elements 108 and a black matrix 110. The color filter elements 108 are arranged in an array form, and each grid pattern of the black matrix 110 is disposed to surround a color filter element 108. In general, each color filter element 108 occupies a unit pixel region and dyed single color of green, red or blue. And in a preferred embodiment, the black matrix 110 can be made of insulating materials such as resin.

Still refer to FIG. 5A, each color filter element 108 is formed beneath the second glass substrate 102 and its edges extend outward to surfaces of the grid pattern of black matrix 110. The grid pattern of black matrix 110 can be applied to define the border of two adjacent color filter elements 108. Even though the two adjacent color filter elements 108 both extend to the surfaces of the black matrix 110, the two adjacent color filter elements 108 will not overlap and can expose a part of lower surfaces of the black matrix 110.

Besides, a common electrode 112 is fabricated beneath the color filter 106 to uniformaly cover the color filter elements 108 and the black matrix 110. It is noted that the black matrix 110 has a considerable height and overlaps the color filter elements 108 and the common electrode 112 to form a downward protruding structure, as shown in FIG. 5A. In general, after fabricating the common electrode 112, an alignment film 114 is formed beneath the common electrode 112 to increase the aligning effect of the liquid crystal molecules.

Besides, several protruding structures can be fabricated on the first glass substrate 100 in the procedures of manufacturing the thin-film transistors. For instance, in the procedure of defining the gate structures, the floating black matrix (Floating BM) 116 made of metal material can be simultaneously fabricated on the first glass substrate 100. As shown in FIG. 5A, the pattern size of the floating black matrix 116 is smaller than that of the black matrix 110. And each grid pattern of the floating black matrix 116 is located under inner edges of the grid pattern of the black matrix 110. Thus, as shown in FIG. 5A, two patterns of the floating black matrix 116 are located under two edges of the grid pattern of the black matrix 110. Besides, the data-line pattern 118 of metal material is fabricated between two adjacent grid patterns of the floating black matrix 116. Namely the data-line pattern 118 formed on the first glass substrate 100 is just under the black matrix 110.

Besides, for increasing the height of the pixel electrode over the first glass substrate 100, an insulating layer 120, an insulating block 122 and a passivation layer 124 are fabricated in sequence and overlapped on the floating black matrix 116 to have an upward protruding structure. As described above, the floating black matrix 116 is manufactured in the procedure of defining the gate structure. Similarly, the insulating layer 120 and the insulating block 122 are fabricated in the procedures of defining the gate oxide and the etching stopper individually. After depositing the passivation layer 124 to cover the upward protruding structure, a pixel electrode 126 is then formed thereon. As shown in FIG. 5A, the pixel electrode 126 is located under the color filter element 108 and extending outward to surfaces of the floating black matrix 116. Similarly, by overlapping the floating black matrix 116, the insulating layer 120, the insulating block 122 and the passivation layer 124, the pixel electrode can be upward protruding.

It is noted that the edges of pixel electrode 126 can not extend over the pattern of the floating black matrix 116 for preventing from the cross talk between the pixel electrode 126 and data-line patterns 118. Further, by overlapping these layers the distance from the pixel electrode 126 to the data-line patterns 118 can be prolonged. Namely, the pixel electrode 126 can not extend to cover the whole data-line patterns 118. Thus, the data signals transferred through the data-line patterns 118 will not interference with the electrical signals transferred in the pixel electrode 126. Similarly, after fabricating the pixel electrode 126, an alignment film 128 is preferably deposited thereon. Please refer to FIG. 5A, on the left side of the central dotted line, the arrangements of the liquid crystal molecules without electric field between upper and first glass substrate 102 and 100 is shown.

When the voltage is supplied to the pixel electrode 126 and the common electrode 112 to generate electric field, the arrangements of the liquid crystal molecules are shown on the right side of the central dotted line in FIG. 5A. Because the gap between the black matrix 110 and the floating black matrix 116 decreases, the electrical field occurring therebetween (as the arrow 130) is larger than that occurring in other parts of the unit pixel region (as the arrow 133) in the liquid crystal layer 104. And an oblique electrical field (as the arrow 132) occurs between the pixel electrode 126 and the common electrode 112. Accordingly, the liquid crystal molecules in the liquid crystal layer will rotate in different directions along the electrical field to have wide viewing angle effect.

It is noted that for the purpose of increasing the response speed and wide viewing angle effect, a protruding structure 134 is defined on the first glass substrate 100 in the procedures of defining the thin-film transistors. The protruding structure 134 composed of a metal block 136, the insulating layer 120, the insulating block 123, a metal pattern 138 and the passivation layer 124. The metal pattern 138 can be defined in the procedure of defining the data-line patterns 118. In a preferred embodiment, the protruding structure 134 is located under the central part of the color filter element 108 to shorten the distance between the pixel electrode 126 and the common electrode 112. Thus, when the pixel electrode 126 and the common electrode 112 are supplied with voltage, the electrical field on this region is getting large (as arrow 140) and the oblique electrical field (as arrow 142) occurs on the inclined edges of the protruding structure 134.

Please refer to FIG. 5B, the top view of a unit pixel region is shown. As described above, the black matrix 110 is defined to surround the color filter element in the unit pixel region. And the floating black matrix 116 is defined on inner edges of the grid pattern of the black matrix 110. As to the pixel electrode 126 fabricated on the first glass substrate can extend from the central region of the color filter element outward to top surfaces of the floating black matrix 116. It is noted that the protruding structure 134 in this embodiment has a crisscross appearance and extend from the central region of the color filter element outward to four different directions. And the cross section views according to the A–A' line and the B–B' line both are shown as the cross section view in FIG. 5A.

Please refer to FIG. 5C, the rotating directions of the liquid crystal molecules after generating the electric field is illustrated. Because the crisscross protruding structure 134 on the central part in the unit pixel region makes the electrical field oblique as arrow 142, the adjacent liquid crystal molecules can rotate toward the protruding structure 134. In the meanwhile the liquid crystal molecules distributed on peripheral part of the unit pixel region can rotate toward the central part due to the large electrical field (arrow 130) and the oblique electrical field (arrow 132) to have four-domain vertical alignment and to increase the wide viewing angle.

Figure 6A:
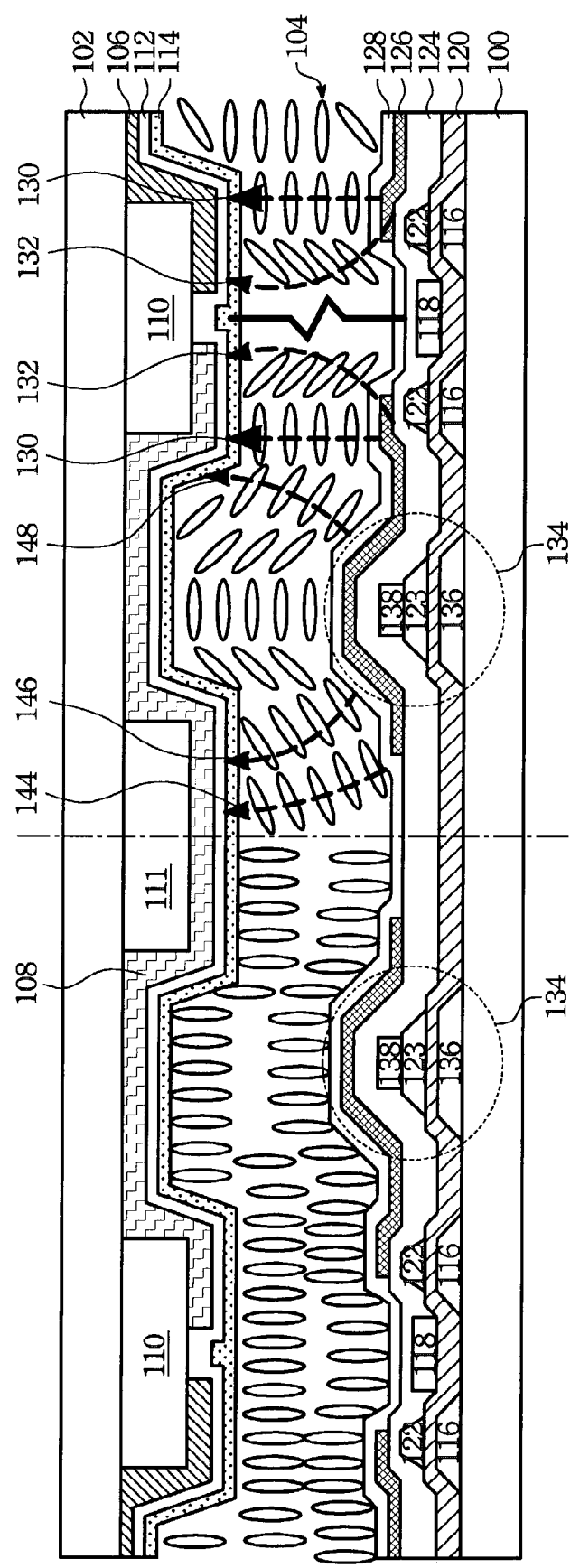
FIGS. 6A, 6B and 6C illustrate the cross section view and top view of the TFT-LCD structure and the alignments of the liquid crystal molecules according to the second embodiment of the present invention.
Figure 6B:
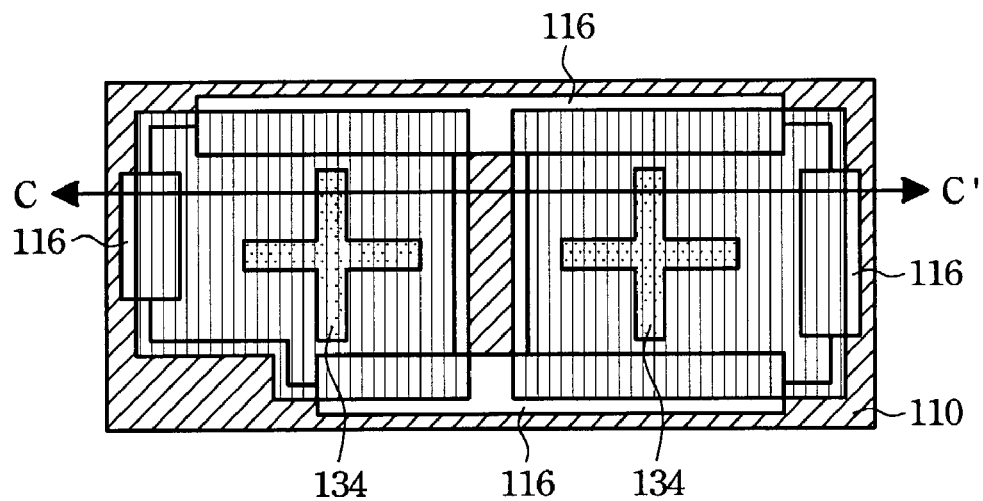
Figure 6C:
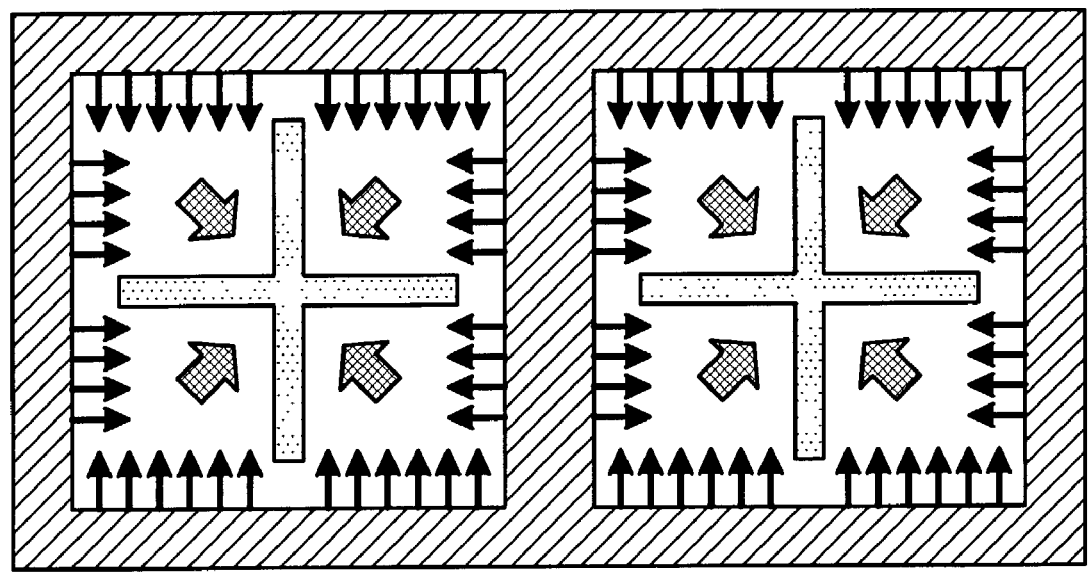

Second Embodiment:

Please refer to FIGS. 6A, 6B and 6C, these figures illustrate another TFT-LCD structure according to the present invention. As mentioned above, the color filter 106 is fabricated beneath the second glass substrate 102. It is noted that the color filter 106 comprises the plural color filter elements 108 and the black matrix 110 has grid patterns which surround each color filter element 108. Additionally the color filter 106 also has a black matrix 111 interposed between the color filter element 108 and the second glass substrate 102. And the pattern of the black matrix 111 is located in the central region of the color filter element 108. Thus, when the common electrode 112 is formed beneath the color filter 106, except the downward protruding structure constructed of overlapped the black matrix 110 and the color filter element 108, another protruding structure constructed of overlapped the black matrix 111 and the color filter element 108 also make the common electrode 112 downward protruding.

For increasing the alignment precision and stability of the liquid crystal molecules, after fabricating the pixel electrode 126 on the first glass substrate 100, a lithography etching procedure is done to form an opening on the pixel electrode 126 under the pattern of the black matrix 111 to expose a part of the passivation layer 124. Besides, a protruding structure 134 is fabricated on the first glass substrate 100 simultaneously in the process of manufacturing the thin-film transistors to increase aligning response speed of the liquid crystal molecules. The protruding structure 134 is located on the first glass substrate 100 between the black matrix 110 and 111. Thus, when the voltage is supplied to the pixel electrode 126 and the common electrode 112, an oblique electrical field (arrow 144) occurs between the opening edges of the pixel electrode 126 and the black matrix 111. Similarly, other oblique electrical fields (such as arrow 146 and 148) occur between the protruding structure 134 and the black matrix 111 & 110. As described above, the left and right sides of the central dotted line illustrate individually alignments of the liquid crystal molecules with the electric field or not.

Please refer to FIG. 6B, the top view of the unit pixel is shown. As mentioned above, the grid pattern of the black matrix 110 is disposed to surround each color filter element. And the grid pattern of the floating black matrix 116 is disposed under inner edges of each grid pattern of the black matrix 110. As to the pixel electrode 126 on the first glass substrate is divided into two parts by the through opening. It is noted that in this embodiment two protruding structures 134 are fabricated individually on the left and right parts of the unit pixel region. And each protruding structure 134 has a crisscross appearance. Further, in the central part of the unit pixel region and beneath the second glass substrate 102 the black matrix 111 is defined to divide the unit pixel region into two parts, as the left and right parts mentioned above. Besides, the cross section view according the line C–C' is shown in FIG. 6A. Refer to FIG. 6C, the rotating directions of the liquid crystal molecules after generating electric field is illustrated. In this embodiment, the eight-domain vertical alignments are obtained to increase the wide viewing angle by introducing the black matrix 111, the opening of the pixel electrode and two crisscross protruding structures 134 in each unit pixel region.

Third Embodiment:

Except for the four-domain and eight-domain vertical alignments as above, the present invention also provides an embodiment of two-domain alignment. Please refer to FIG. 7A, as above, after the pixel electrode 126 is formed on the first glass substrate 100, a lithography etching procedure is next done to form an opening on the pixel electrode 126 for exposing a part of the passivation layer 124. In this embodiment, the opening of the pixel electrode 126 is located on the central part of the unit pixel region. Thus, when the voltage is supplied to the pixel electrode 126 and the common electrode 112, an oblique electrical field (arrow 150) occurring between the opening edges and the common electrode 112 makes the liquid crystal molecules rotate toward the opening edges of the pixel electrode 126. As described above, the left and right sides of the central dotted line illustrate individually alignments of the liquid crystal molecules with electric field or not.

Figure 7A:
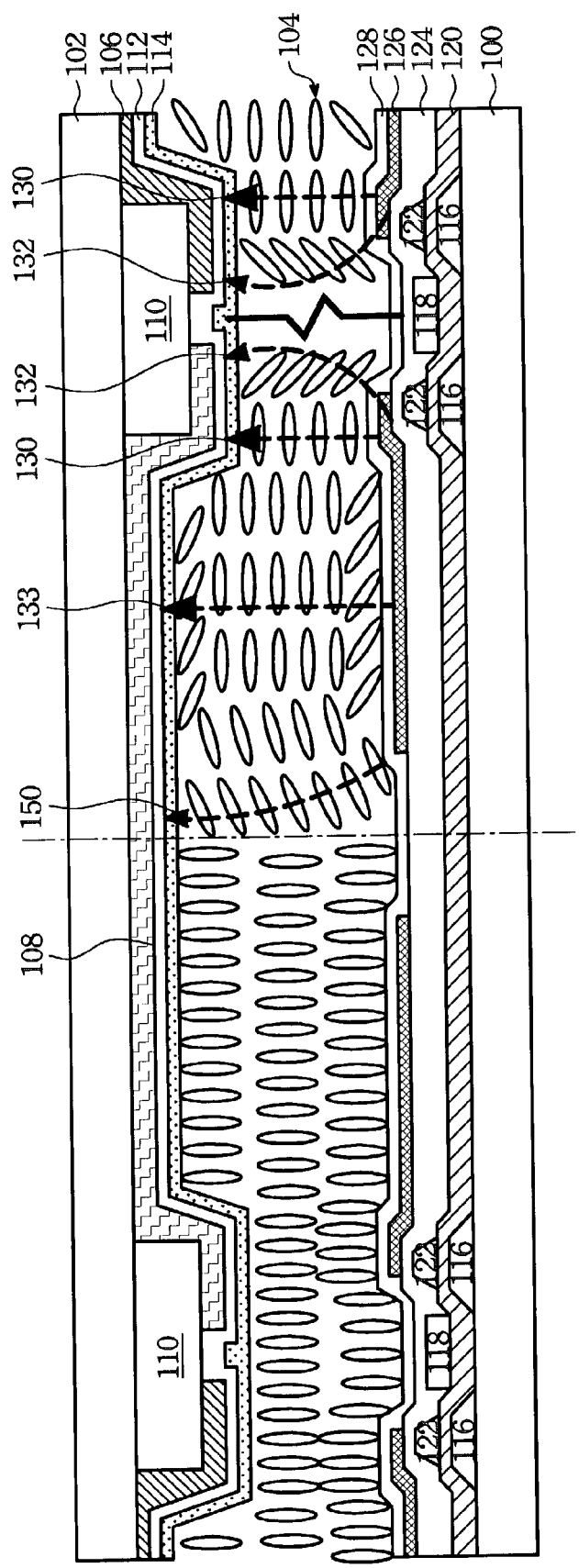
FIGS. 7A, 7B and 7C illustrate the cross section view and top view of the TFT-LCD structure and the alignments of the liquid crystal molecules according to the third embodiment of the present invention.
Figure 7B:
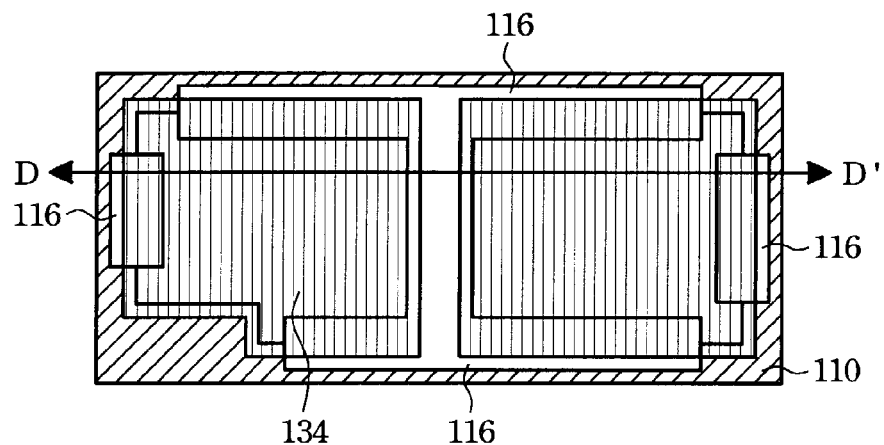
Figure 7C:
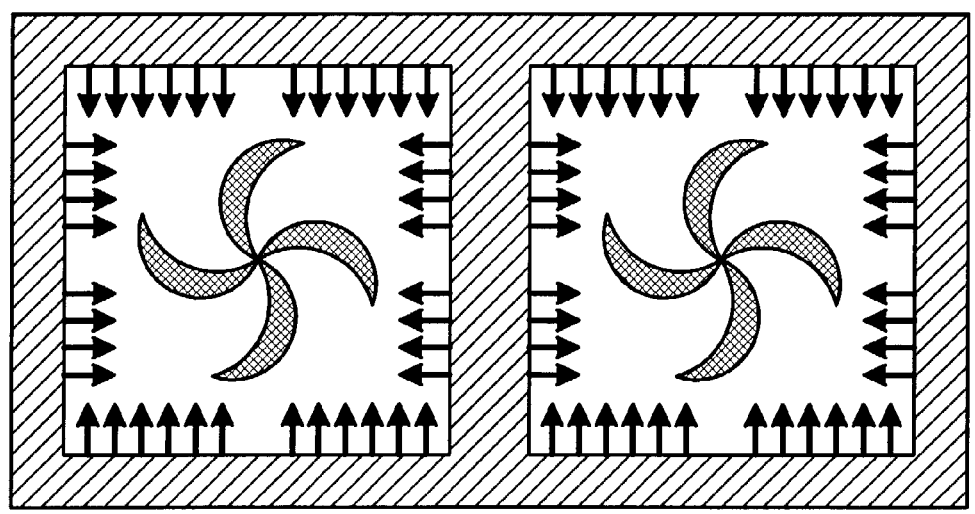

Please refer to FIG. 7B, the top view of the unit pixel region is illustrated. The grid patterns of the black matrix 110 and the floating black matrix 116 are both disposed to surround a color filter element. As to the pixel electrode 126 on the first glass substrate is divided into left and right parts by the opening crossing thereon. The cross section view according to the line D–D' is shown in FIG. 7A. When the pixel electrode 126 and the common electrode are supplied with voltage, an oblique electrical field (as arrow 150) occurring between the opening edges and the common electrode makes the liquid crystal molecules in the central part of the unit pixel region rotate toward individually to two edges of the pixel electrode 126, and has the two-domain vertical alignment as shown in FIG. 7C. It is noted that in this embodiment there is no protruding structure 134 formed on the first glass substrate. Thus the liquid crystal molecules distributed in the left and right parts of the unit pixel region will have twist toppling alignments.

Compared to the alignment of the liquid crystal molecules in the prior art, the TFT-LCD structures provided in the present invention have considerable advantages as follows:

(1) by applying the color filter with the insulating black matrix, the protruding structures can be formed on the peripheral part of the unit pixel region to have the large electrical field thereon and the oblique electrical field adjacent thereto for the purpose of rotating the liquid crystal molecules in predetermined directions to increase the wide viewing angle;

(2) by fabricating protruding structure on the first glass substrate and in the central part of the unit pixel region, the large electrical field and the oblique electrical field occurring thereon can shorten the response time of the alignments of the liquid crystal molecules according the electrical fields;

(3) because the above insulating black matrix and the protruding structure can be fabricated by the original process for defining the TFT-LCD devices, no extra step is required to form those black matrix and the protruding structure, and the producing periods will not be prolonged;

(4) besides, the above protruding structure is formed by stacking various material layers in the process of defining the thin film transistors. So the main function of the stack structure is to let the pixel electrode more closed to the common electrode of the second glass substrate. Thus even some alignment inaccuracy occurring in stacking material layers, the stacked protruding structure still can have the above function.

While the preferred embodiment of the invention has been illustrated and described, it will be appreciated that various changes can be made therein without departing from the spirit and scope of the invention.

What is claimed:

1. A TFT-LCD having a first glass substrate with a plurality of transistors, a second glass substrate, and a liquid crystal layer interposed between the second and first glass substrates, the TFT-LCD comprising:

a plurality of color filter elements and a first black matrix formed beneath the second glass substrate, wherein the first black matrix having a grid pattern to define a pixel unit region, the color filter elements covering the pixel unit region and being overlapped with the first black matrix for composing a first protruding structure;

a common electrode formed beneath the second glass substrate and covering the first protruding structure;

a second black matrix, an insulating layer, a insulating block, and a passivation layer sequentially formed on the first glass substrate and overlapped for composing a second protruding structure; and a pixel electrode formed on the first glass substrate corresponding to the pixel unit region and covering the second protruding structure, wherein the second black matrix is made of the same material of a gate electrode of the transistor, and the insulating block is made of the same material of an etching stopper of the transistor.

2. The TFT-LCD of claim 1, wherein the insulating layer of the second protruding structure is made of the same material of a gate insulating layer of the transistor.

3. The TFT-LCD of claim 1, wherein the first black matrix is a resin black matrix (Resin BM).

4. The TFT-LCD of claim 1, wherein the second protruding structure is disposed under and aligned to the grid pattern of the first black matrix.

5. The TFT-LCD of claim 1, wherein the second protruding structure further comprises a metal pattern positioned between the insulating block and the psaaivation layer.

6. The TFT-LCD of claim 5, wherein the metal pattern is made of the same material of a data line.

7. The TFT-LCD of claim 5, wherein the second protruding structure is disposed under and within the pixel unit region.

8. The TFT-LCD of claim 1, wherein the pixel electrode has an opening to expose a part of the passivation layer.

9. The TFT-LCD of claim 1, further comprising a third black matrix formed beneath the second glass substrate and within the pixel unit region.

10. The TFT-LCD of claim 9, wherein the color filter element is overlapped with the third black matrix for composing a third protruding structure.

11. The TFT-LCD of claim 9, wherein the common electrode formed beneath the second glass substrate is covering the third protruding structure.

12. The TFT-LCD of claim 1, wherein the second black matrix and the gate electrode of the transistor are formed in a same layer.

13. The TFT-LCD of claim 1, wherein the insulating block and the etching stopper of the transistor are formed in a same layer.

14. A TFT-LCD having a first glass substrate with a plurality of transistors, a second glass substrate, and a liquid crystal layer interposed between the second and first glass substrates, the TFT-LCD comprising:
- a plurality of color filter elements and a first black matrix formed beneath the second glass substrate, wherein the first black matrix having a grid pattern to define a pixel unit region, the color filter elements covering the pixel unit region and being overlapped with the first black matrix for composing a first protruding structure;
- a common electrode formed beneath the second glass substrate and covering the first protruding structure;
- a second black matrix, an insulating layer, a insulating block, and a passivation layer sequentially formed on the first glass substrate and overlapped for composing a second protruding structure, wherein the second black matrix and a gate electrode of the transistor are formed in a same layer, and the insulating block and an etching stopper of the transistor are formed in a same layer; and
- a pixel electrode formed on the first glass substrate corresponding to the pixel unit region and covering the second protruding structure,
- wherein the first protruding structure is applied to raise a part of the common electrode and the second protruding structure is applied to raise a part of the pixel electrode, thereby enhancing an electrical field therebetween when the pixel electrode and the common electrode are supplied with voltage.

15. A TFT-LCD having a first glass substrate with a plurality of transistors, a second glass substrate, and a liquid crystal layer interposed between the second and first glass substrates, the TFT-LCD comprising:
- a plurality of color filter elements and a first black matrix formed beneath the second glass substrate, wherein the first black matrix having a grid pattern to define a pixel unit region, the color filter elements covering the pixel unit region and being overlapped with the first black matrix for composing a first protruding structure;
- a common electrode formed beneath the second glass substrate and covering the first protruding structure;
- a second black matrix, an insulating layer, a insulating block, and a passivation layer sequentially formed on the first glass substrate and overlapped for composing a second protruding structure, wherein the second black matrix is made of the same material of a gate electrode of the transistor, and the insulating block is made of the same material of an etching stopper of the transistor; and
- a pixel electrode formed on the first glass substrate corresponding to the pixel unit region and covering the second protruding structure,
- wherein the first protruding structure is applied to raise a part of the common electrode and the second protruding structure is applied to raise a part of the pixel electrode, thereby shortening a distance between said part of the common electrode and said part of the pixel electrode.

16. The TFT-LCD of claim 15, wherein the second black matrix and the gate electrode of the transistor are formed in a same layer.

17. The TFT-LCD of claim 15, wherein the insulating block and the etching stopper of the transistor are formed in a same layer.

* * * * *